US010509393B2

(12) United States Patent
Yamamoto et al.

(10) Patent No.: US 10,509,393 B2
(45) Date of Patent: Dec. 17, 2019

(54) CONTROL DEVICE AND CONTROL METHOD

(71) Applicant: OMRON Corporation, Kyoto (JP)

(72) Inventors: Eiji Yamamoto, Kyoto (JP); Masahiko Nakano, Ritto (JP); Yoshimi Kamitani, Kyoto (JP); Tetsushi Jakunen, Kusatsu (JP)

(73) Assignee: OMRON Corporation, Kyoto (JP)

( * ) Notice: Subject to any disclaimer, the term of this patent is extended or adjusted under 35 U.S.C. 154(b) by 188 days.

(21) Appl. No.: 15/894,881

(22) Filed: Feb. 12, 2018

(65) Prior Publication Data

US 2019/0079497 A1    Mar. 14, 2019

(30) Foreign Application Priority Data

Sep. 13, 2017  (JP) .................. 2017-175719

(51) Int. Cl.
*G05B 19/41* (2006.01)
*G05B 19/414* (2006.01)
*G05B 19/04* (2006.01)

(52) U.S. Cl.
CPC ............ *G05B 19/4148* (2013.01); *G05B 2219/43196* (2013.01)

(58) Field of Classification Search
CPC ............ G05B 19/0426; G05B 19/4145; G05B 2219/34287; G05B 2219/34288; G05B 2219/34302; G05B 2219/43196
USPC ........................................................ 700/19
See application file for complete search history.

(56) References Cited

U.S. PATENT DOCUMENTS

| 6,081,090 A | 6/2000 | Takaki et al. |
| 2012/0074876 A1* | 3/2012 | Redler .................. B60L 15/32 318/41 |
| 2017/0139398 A1* | 5/2017 | Tsuzuki ............... G05B 19/406 |

FOREIGN PATENT DOCUMENTS

| EP | 1435551 | 7/2004 |
| EP | 2672346 | 12/2013 |
| WO | 2016157395 | 10/2016 |

OTHER PUBLICATIONS

"Search Report of Europe Counterpart Application", dated Sep. 4, 2018, p. 1-p. 10.

* cited by examiner

*Primary Examiner* — Michael J Brown
(74) *Attorney, Agent, or Firm* — JCIPRNET

(57) ABSTRACT

A control device and a control method capable of realizing control based on a sequence program and control based on a numerical control program with a smaller number of process steps are provided. The control device that is capable of controlling a plurality of motors includes: a first program executing unit that executes a sequence program for each control cycle; a second program executing unit that calculates an instruction value for each motor in accordance with a numerical control program; and a state managing unit that manages a control state correlated with a group including a plurality of predetermined motors of the plurality of motors. The state managing unit updates the control state based on at least one of an instruction from the first program executing unit and an execution state of the numerical control program in the second program executing unit.

20 Claims, 10 Drawing Sheets

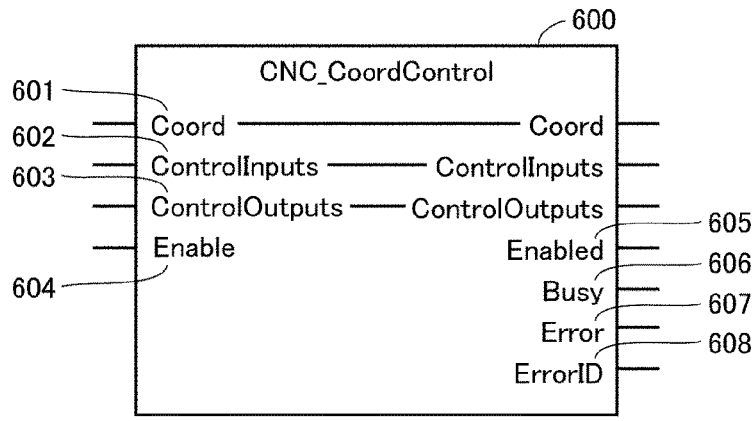

_CNC_Coord[0]                    . CNC COORDINATE SYSTEM (AXIS GROUP)
                                 · VARIABLE
_CNC_Coord[0].Status             . HIERARCHY INDICATING CNC COORDINATE
                                 · SYSTEM STATUS                          ⎫
_CNC_Coord[0].Status.Standby     : PREPARATION OF CNC COORDINATE SYSTEM   ⎬ 622
_CNC_Coord[0].Status.Moving      : MOVING OF CNC COORDINATE SYSTEM        ⎭
            ⋮

_CNC_Coord[0].Cfg                . HIERARCHY INDICATING BASIC SETTING OF
                                 · CNC COORDINATE SYSTEM                  ⎫
_CNC_Coord[0].Cfg.CoordNo        : CNC COORDINATE SYSTEM NUMBER           ⎪
_CNC_Coord[0].Cfg.CoordEnable    : USE OF CNC COORDINATE SYSTEM           ⎬ 624
_CNC_Coord[0].Cfg.PosMotorNum    : NUMBER OF CNC MOTORS                   ⎪
_CNC_Coord[0].Cfg.PosAxis[0]     . HIERARCHY INDICATING POSITIONING AXIS 0⎪
                                 · OF CNC COORDINATE SYSTEM               ⎪
_CNC_Coord[0].Cfg.PosAxis[1]     . HIERARCHY INDICATING POSITIONING AXIS 1⎭
                                 · OF CNC COORDINATE SYSTEM
            ⋮
```

FIG. 9

CONTROL DEVICE AND CONTROL METHOD

CROSS-REFERENCE TO RELATED APPLICATION

This application claims the priority benefit of Japanese application serial no. 2017-175719, filed on Sep. 13, 2017. The entirety of the above-mentioned patent application is hereby incorporated by reference herein and made a part of this specification.

BACKGROUND

Technical Field

The disclosure relates to a control device capable of controlling a plurality of motors and a control method in the control device.

Description of Related Art

In the related art, machine tools based on computer numerical control (CNC) (hereinafter also generically referred to as "CNC machine tools") have been used in various production fields. In the CNC machine tools, a plurality of machine elements which are referred to as "axes" are often combined to perform processes. In such cases, there is demand for controlling a plurality of axes together.

For example, International publication NO. WO 2016/157395 (Patent Document 1) discloses a numerical control device that can group machine elements into a single system or a multiple system in which two or more systems are combined and can machine a workpiece using the grouped machine elements.

In the numerical control device disclosed in International publication NO. WO 2016/157395 (Patent Document 1), a program interpreting unit that interprets each machining program and a programmable logic controller (PLC) that processes a ladder program are arranged. In this configuration, when a workpiece is machined by a CNC machine tool, for example, driving of an injector that injects a cutting oil is controlled and driving of a belt conveyor that conveys the workpiece machined by the CNC machine tool is controlled, but states of axes in the CNC machine tool cannot be directly ascertained. Accordingly, for example, when the PLC performs processes based on the states of the axes in the CNC machine tool, there is a problem in that a program and a mechanism for acquiring the states of the axes in the CNC machine tool have to be provided and a high cost and a large number of process steps are necessary.

SUMMARY

In view of the above, the disclosure provides a control device capable of realizing control based on a sequence program and control based on a numerical control program with a smaller number of process steps.

According to an embodiment of the disclosure, a control device that is capable of controlling a plurality of motors is provided. The control device includes: a first program executing unit that executes a sequence program for each control cycle; a second program executing unit that calculates an instruction value for each motor in accordance with a numerical control program; and a state managing unit that manages a control state correlated with a group including a plurality of predetermined motors of the plurality of motors. The sequence program includes a control command for controlling a process of executing the numerical control program in the second program executing unit. The first program executing unit gives an instruction relevant to execution of the numerical control program in the second program executing unit in accordance with the control command included in the sequence program. The state managing unit updates the control state based on at least one of the instruction from the first program executing unit and an execution state of the numerical control program in the second program executing unit.

According to another embodiment of the disclosure, a control method in a control device that is capable of controlling a plurality of motors is provided. The control method includes: a step of executing a sequence program for each control cycle; a step of calculating an instruction value for each motor in accordance with a numerical control program; and a step of managing a control state correlated with a group including a plurality of predetermined motors of the plurality of motors. The sequence program includes a control command for controlling a process of executing the numerical control program. Execution of the numerical control program is controlled by an instruction in accordance with the control command included in the sequence program. The step of managing the control state includes updating the control state based on at least one of the instruction in accordance with the control command included in the sequence program and an execution state of the numerical control program.

BRIEF DESCRIPTION OF THE DRAWINGS

FIG. 8 is a diagram schematically illustrating a function block corresponding to a CNC_CoordControl (CNC coordinate control) command in the control device according to the embodiment.

FIG. 9 is a diagram illustrating an example of a structure variable correlated with an axis group in the control device according to the embodiment.

DESCRIPTION OF THE EMBODIMENTS

Figure 1:
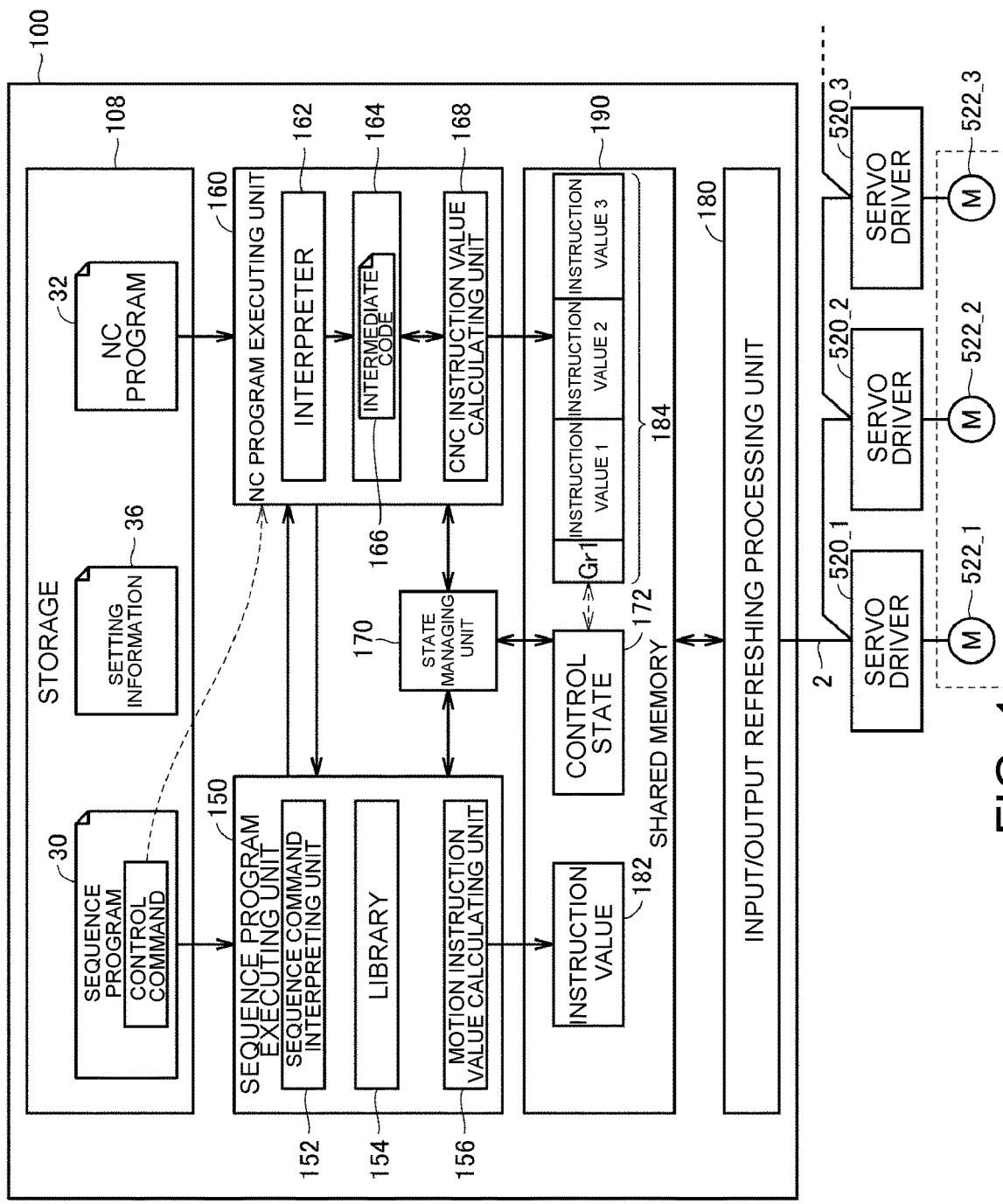
FIG. 1 is a diagram schematically illustrating an example of a situation in which a control device according to an embodiment is applied.

According to this disclosure, since the control state of the group including a plurality of predetermined motors of the plurality of motors can be managed without preparing a special program, it is possible to reduce the number of process steps when preparing a program for controlling the group.

In the disclosure, the first program executing unit may calculate an operation result based on the sequence program in reflection of a value of the control state managed by the state managing unit in accordance with a command for referring to the control state, the command being included in the sequence program.

According to this disclosure, it is possible to more easily realize control logic for the motors belonging to the group in the sequence program.

In the disclosure, the state managing unit may store the value of the control state such that the value is able to be referred to as a member of a structure variable.

According to this disclosure, it is possible to enhance reusability of a program or the like. In the disclosure, the structure variable may include information on setting of a corresponding group as a further member.

According to this disclosure, it is possible to more simply prepare a program. In the disclosure, the state managing unit may switch the control state between a plurality of states which are able to be taken by the second program executing unit during execution of the numerical control program and a plurality of states which are able to be taken by the second program executing unit during non-execution of the numerical control program.

According to this disclosure, it is possible to provide the value of the control state with reflection of contents or the like requiring management of the numerical control program which is executed by the second program executing unit.

In the disclosure, the control device may further include a shared memory that stores the value of the control state managed by the state managing unit.

According to this disclosure, it is possible to facilitate access to the value of the control state from the first program executing unit and the second program executing unit.

In the disclosure, the control command included in the sequence program may be defined in the form of a function block.

According to this disclosure, it is possible to enhance reusability of the sequence program and to enhance the quality of the sequence program.

In the disclosure, a support device that provides a user interface receiving designation of the plurality of motors belonging to the group may be connectable to the control device.

According to this disclosure, it is possible to facilitate setting of a group including a plurality of motors. In the disclosure, the control state may indicate a single state covering the plurality of motors included in the group.

According to the disclosure, it is possible to provide the value of the control state which is suitable for controlling a plurality of motors together.

According to the disclosure, since the control state of the group including a plurality of predetermined motors of the plurality of motors can be managed without preparing a special program, it is possible to reduce the number of process steps when preparing a program for controlling the group.

According to an embodiment of the disclosure, it is possible to provide a control device capable of realizing control based on a sequence program and control based on a numerical control program with a smaller number of process steps.

Embodiments of the disclosure will be described below in detail with reference to the accompanying drawings. The same or corresponding elements in the drawings will be assigned with the same reference signs and description thereof will not be repeated.

A. APPLICATION EXAMPLE

First, an example of a situation in which the disclosure is applied will be described below with reference to FIG. 1. FIG. 1 is a diagram schematically illustrating an example of a situation in which a control device 100 according to an embodiment is applied.

Referring to FIG. 1, the control device 100 is configured to control a plurality of motors. In the application example illustrated in FIG. 1, servo motors 522_1, 522_2, and 522_3 (hereinafter generically referred to as "servo motors 522") as an example of the motors are controlled. The servo motors 522_1, 522_2, and 522_3 are driven by servo drivers 520_1, 520_2, and 520_3 (hereinafter generically referred to as "servo drivers 520") which are connected to the control device 100 via a field network 2. That is, instruction values which are calculated by processes which will be described later are given from the control device 100 to the servo drivers 520 respectively.

The "motor" in the disclosure is not limited to a servo motor and is a concept covering any driving device including a synchronous motor and an induction motor. The "motor" in the disclosure may also include a device that performs a linear motion instead of a rotational motion, such as a linear motor. When the servo motors 522 are driven, the servo drivers 520 are used and a device suitable for driving the motors is selected depending on the types of the motors.

For example, in an industrial robot or a CNC machine tool, when an action is applied to a workpiece, it is necessary to drive a plurality of motors in cooperation with each other. That is, it is necessary to synchronously give instruction values respectively to the plurality of motors. In this specification, the motors to which the instruction values need to be given synchronously are referred to as a "group."

In general, directions (axis directions) in which the motors belonging to any group move an object are different from each other, and a space which is defined by the axes is also referred to as a "coordinate system." For example, when three motors belonging to a certain group drive an X axis, a Y axis, and a Z axis of a CNC machine tool respectively, the motors belonging to the group are correlated with an "X-Y-Z coordinate system." Paying attention to the axis directions in which the motors move an object, in the following description, each group may be referred to as an "axis group," and the "axis group" may be referred to as a "CNC coordinate system" which is defined by the axes allocated to the motors belonging to the group. In other words, the "CNC coordinate system" corresponds to a concept of abstracting a CNC machine tool which is constituted by a plurality of motors belonging to the group.

In general, the number of motors and the number of axes in one axis group are equal to each other, but a single axis may be rotationally driven by a plurality of motors. In that case, the number of motors is larger than the number of axes.

In the application example illustrated in FIG. 1, corresponding instruction values are transmitted (communicated) from the control device 100 to the respective servo drivers 520 via the field network 2, but the disclosure is not limited thereto. The control device 100 may be connected to the servo drivers 520 in a wired manner, so as to directly transmit signals indicating the instruction values to the servo drivers.

The control device 100 includes a storage 108, a sequence program executing unit 150, a numerical control program executing unit 160 (hereinafter also abbreviated to an "NC program executing unit"), and a state managing unit 170 that manages a control state 172 correlated with a group (an axis group) including a plurality of predetermined motors of the plurality of motors. The control state 172 indicates a single state covering a plurality of motors included in the axis group. That is, the control state 172 indicates a state value of the axis group as a whole.

A sequence program 30 and a numerical control program 32 (hereinafter also abbreviated to an "NC program") are stored in the storage 108.

The sequence program executing unit 150 is an example of a first program executing unit that executes the sequence program 30 for each control cycle, and the NC program executing unit 160 is an example of a second program executing unit that calculates instruction values 184 for the motors in accordance with the NC program 32.

The sequence program executing unit 150 calculates one or more instruction values 182 by cyclically executing the sequence program 30.

The "sequence program" in the disclosure is a concept including a program which is entirely scanned for every execution and in which one or more instruction values are calculated for every execution. The "sequence program" includes a program including one or more commands which are written based on the international standard IEC61131-3 which is defined by the International Electrotechnical Commission (IEC). The "sequence program" may include a sequence command and/or a motion command. The "sequence program" is not limited to commands which are written based on the international standard IEC61131-3, and may include commands which are independently defined by a manufacturer or a vendor of a programmable logic controller (PLC). In this way, the "sequence program" is suitable for control requiring immediacy and rapidity.

In this specification, the "sequence command" is a term basically including one or more commands which are written by one or more logical circuits that calculate an input value, an output value, an internal value, and the like. Basically, the "sequence command" is executed from the beginning to the end in one control cycle, and the "sequence command" is executed from the beginning to the end again in the next control cycle. In this specification, a "motion command" is a term including one or more commands for calculating numerical values of a position, a velocity, an acceleration, a jerk, an angle, an angular velocity, an angular acceleration, an angular jerk, and the like for actuators such as servo motors as instructions. In one control cycle, the "motion command" is also executed from the beginning to the end of a program of the motion command (a motion program) which is written by function blocks or numerical value calculating expressions. That is, the instruction value is calculated (updated) in each control cycle.

One or more instruction values 182 which are calculated by the sequence program executing unit 150 typically include ON/OFF of a digital output which is determined in accordance with the sequence command and an analog output which is calculated in accordance with the motion command.

The NC program executing unit 160 sequentially updates the instruction values 184 such that a locus described by the NC program 32 can be realized by sequentially interpreting the NC program 32. When an axis group is set as described above, the NC program executing unit 160 synchronously outputs the instruction values 184 respectively for a plurality of motors belonging to the same axis group.

A "numerical control program" in the disclosure includes a program that describes a behavior in CNC. The "numerical control program" is typically written in an interpreter manner in which the program is sequentially interpreted and executed row by row, and is sequentially interpreted and executed. For example, an NC program is often written using a "G code," but is not limited thereto, and any language can be employed.

The sequence program 30 includes a control command for controlling an execution process of the NC program 32 in the NC program executing unit 160. The sequence program executing unit 150 gives an instruction associated with execution of the NC program executing unit 160 by executing the sequence program 30. For example, the sequence program executing unit 150 can start or stop the execution process of the NC program 32 in the NC program executing unit 160 by executing the control command included in the sequence program 30.

The axis group is arbitrarily set depending on mechanism of a device that serves as a target. Setting information 36 stored in the storage 108 includes setting of the axis group.

Typically, one or more instruction values 182 output from the sequence program executing unit 150, the instruction values 184 output from the NC program executing unit 160, and the control state 172 managed by the state managing unit 170 are stored in a shared memory 190. Nevertheless, dedicated areas for storing respective data may be provided.

By providing the shared memory 190 that stores a value of the control state managed by the state managing unit 170, it is possible to facilitate access from the sequence program executing unit 150 and the NC program executing unit 160.

In each predetermined cycle, an input/output refreshing processing unit 180 transmits output data including the instruction values 182 and the instruction values 184 to a field side and acquires input data such as measured values from the field side. In this specification, exchanges of input data and output data between the control device 100 and the field side is also referred to as an "input/output refreshing process."

The state managing unit 170 updates the control state 172 based on at least one of an instruction from the sequence program executing unit 150 to the NC program executing unit 160 and the execution state of the NC program 32 in the NC program executing unit 160. The control state 172 includes information indicating a state of each axis group and includes, for example, state information such as "moving," "standby," and "stopping" with respect to a specific axis group.

In the control device 100 according to the embodiment, the sequence program 30 which is scanned for each control cycle and the NC program 32 which is sequentially interpreted are executed respectively to calculate the respective instruction values. By including a predetermined control command in the sequence program 30, the execution time or the like of the NC program 32 in the NC program executing unit 160 can be controlled.

Moreover, in the control device 100 according to the embodiment, the control state 172 correlated with any axis group is appropriately updated. The sequence program executing unit 150 can dynamically control execution of the NC program 32 in the NC program executing unit 160 and the like with reference to the value of the control state 172.

In addition, in the control device 100 according to the embodiment, since the sequence program executing unit 150 can ascertain the state of the NC program executing unit 160 by referring to the value of the control state 172, a program is not required for exchanging information of the state between the sequence program executing unit 150 and the NC program executing unit 160. Accordingly, it is possible to reduce the number of process steps for preparing the sequence program 30. As a result, it is possible to reduce costs of program preparation and to reduce the volume of the program itself.

A more detailed configuration and process of the control device 100 according to the embodiment will be described below as a specific application example of the disclosure.

B. EXAMPLE OF ENTIRE CONFIGURATION OF CONTROL SYSTEM

Figure 2:
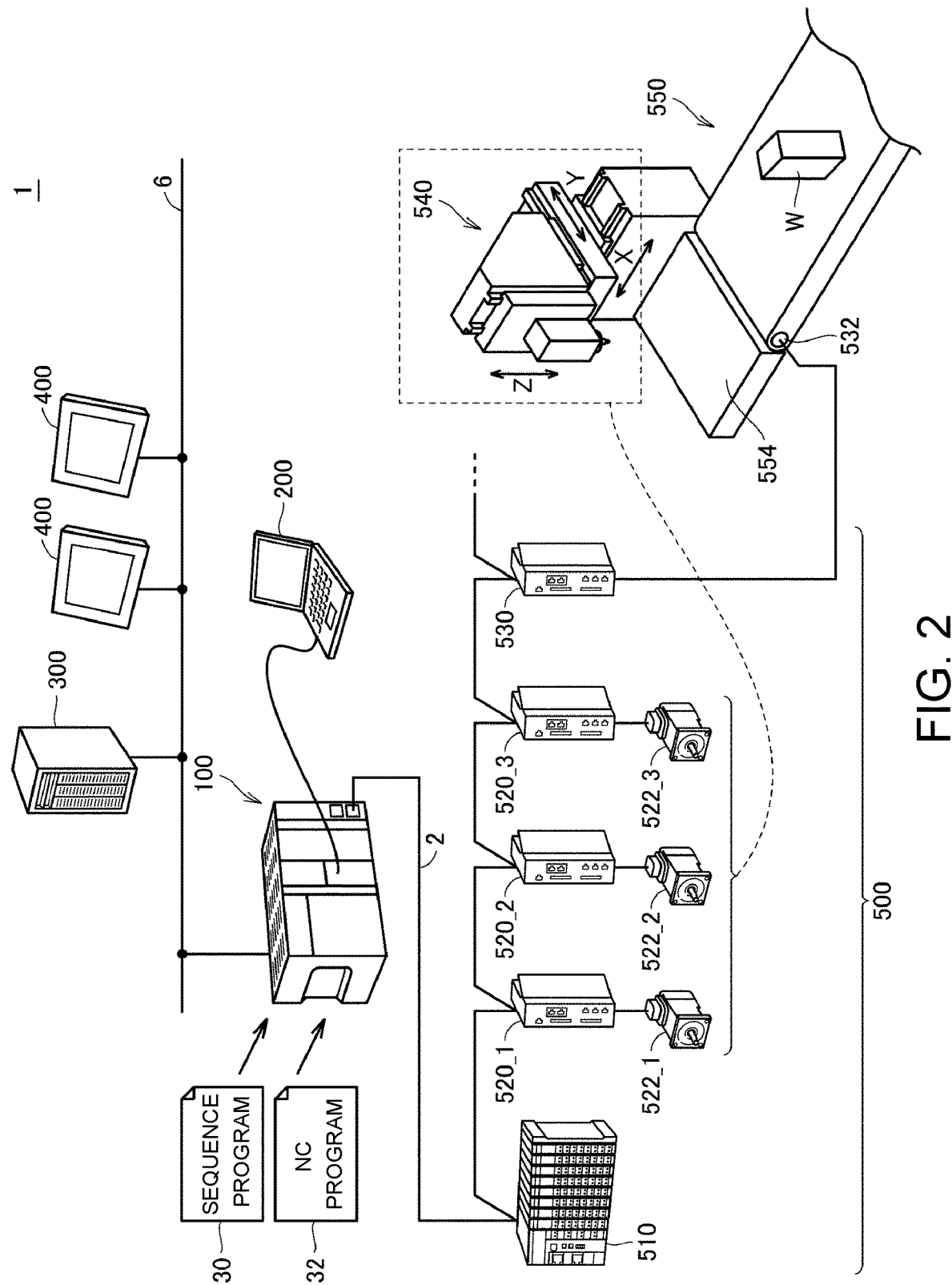
FIG. 2 is a diagram schematically illustrating an example of an entire configuration of a control system according to the embodiment.

Next, an example of the entire configuration of a control system 1 including the control device according to the embodiment will be described below. FIG. 2 is a diagram schematically illustrating an example of the entire configuration of the control system 1 according to the embodiment. FIG. 2 illustrates the control system 1 centered on the control device 100 according to the embodiment.

The control device 100 corresponds to an industrial controller that controls a control target such as various facilities or equipment. The control device 100 is a kind of computer that executes a control operation as will be described later and may be typically embodied as a programmable logic controller (PLC). The control device 100 may be connected to various field devices 500 via the field network 2. The control device 100 exchanges data between one or more field devices 500 via the field network 2 or the like. In general, the "field network" is also referred to as a "field bus," but for simplification of the description, it is collectively referred to as "field network" in the following description. That is, the "field network" is a concept including "field bus" in addition to "field network" in the narrow sense.

A control operation which is performed in the control device 100 includes a process (an input process) of collecting data (input data) collected or generated in the field devices 500, a process (a calculation process) of generating data (output data) such as instruction values for the field devices 500, and a process (an output process) of transmitting the generated output data to target field devices 500.

The field network 2 may employ a bus or a network that enables fixed-cycle communication. Such a bus or network that enables fixed-cycle communication is EtherCAT (registered trademark), EtherNet/IP (registered trademark), DeviceNet (registered trademark), CompoNet (registered trademark), and the like. From the viewpoint of guaranteeing an arrival time of data, EtherCAT (registered trademark) may be used.

Any field device 500 can be connected to the field network 2. The field device 500 includes an actuator that applies a certain physical action to production equipment, production lines, and the like on the field side, and an input/output device that exchanges information with the field.

The control device 100 and the field device 500 exchange data between each other via the field network 2, and the exchanged data is updated in a very short period in an order of several hundreds of μsec to several tens of msec.

In the example of the configuration illustrated in FIG. 2, the control device 100 controls a CNC machine tool 540 and a conveyor device 550 that supplies a workpiece W to the CNC machine tool 540.

The CNC machine tool 540 machines any object by controlling a machining center or the like in accordance with the NC program 32 that designates a position, a velocity, and the like. The CNC machine tool 540 is not limited to the illustrated example, and can be applied to any machining device such as a lathe processing machine, a milling machine, or an electric discharge machine.

The CNC machine tool 540 and the conveyor device 550 are driven in accordance with the instruction values from the control device 100. The workpiece W which is conveyed by the conveyor device 550 is disposed on a worktable 554 and is subjected to machining designated by the CNC machine tool 540.

In the example of the configuration illustrated in FIG. 2, the field device 500 includes a remote input/output (I/O) device 510, servo drivers 520_1, 520_2, and 520_3, servo motors 522_1, 522_2, and 522_3, and a servo driver 530.

The remote I/O device 510 typically includes a communication coupler that performs communication via the field network 2 and an input/output unit (hereinafter also referred to as an "I/O unit") that acquires input data and outputs output data. A device that collects input data such as an input relay or various sensors (such as an analog sensor, a temperature sensor, and a vibration sensor) and a device that applies a certain action in the field such as an output relay, a contactor, a servo driver, and other actuators are connected to the remote I/O device 510.

The field device 500 is not limited thereto and any device (for example, a visual sensor) that collects input data, any device (for example, an inverter device) that applies a certain action based on the output data, various robots, and the like can be employed.

The servo motors 522_1, 522_2, and 522_3 are assembled as a part of the CNC machine tool 540, and the servo driver 530 drives a servo motor 532 connected to the conveyor of the conveyor device 550. The servo drivers 520_1, 520_2, 520_3, and 530 drive the corresponding servo motors in accordance with the instruction values (for example, a position instruction value or a velocity instruction value) from the control device 100.

For example, in the example of the configuration illustrated in FIG. 2, the servo motors 522_1, 522_2, and 522_3 are drive sources of the X axis, the Y axis, and the Z axis of the CNC machine tool 540 and may control the three axes integrally. In the following description, it is assumed that the servo motors 522_1, 522_2, and 522_3 are set as one axis group.

The control device 100 according to the embodiment can create an instruction value for controlling the behavior of the CNC machine tool 540 by executing the NC program 32 as well as an instruction value determined in accordance with the sequence command and the motion command by executing the sequence program 30. Nevertheless, start and end of execution of the NC program 32 and the like are controlled by the control command included in the sequence program 30.

The control device 100 is also connected to another device via a host network 6. Ethernet (registered trademark) or EtherNet/IP (registered trademark) which is a general network protocol may be employed for the host network 6. More specifically, one or more server devices 300 and one or more display devices 400 may be connected to the host network 6.

It is assumed that the server device 300 may be a database system, a manufacturing execution system (MES), or the like. The manufacturing execution system serves to acquire information from manufacturing equipment or facilities as a control target and to monitor and manage the whole production, and may handle order information, quality information, shipment information, and the like. Devices connected to the host network 6 are not limited to the aforementioned devices, and a device that provides an information system service may also be connected to the host network 6. It is assumed that the information system service may be a process of acquiring information from manufacturing equipment or facilities as a control target and performing macro or micro analysis, such as data mining of extracting certain characteristic trends included in the information from manufacturing equipment or facilities as a control target, a machine learning tool for performing machine learning based on the information from manufacturing equipment or facilities as a control target, and the like.

The display device 400 receives an operation from a user, outputs a command corresponding to the user's operation to the control device 100, and graphically displays an operation result and the like in the control device 100.

A support device 200 may be connected to the control device 100. The support device 200 is a device that supports necessary preparation for the control device 100 to control the control target. Specifically, the support device 200 provides a development environment (a program preparing and editing tool, a parser, a compiler, and the like) for the program to be executed in the control device 100, a setting environment for setting configuration information (configuration) of the control device 100 and various devices connected to the control device 100, a function of outputting a created user program to the control device 100, a function of correcting and changing a user program and the like which is executed in the control device 100 online, and the like.

C. EXAMPLE OF HARDWARE CONFIGURATION OF CONTROL DEVICE

An example of a hardware configuration of the control device 100 according to the embodiment will be described below.

Figure 3:
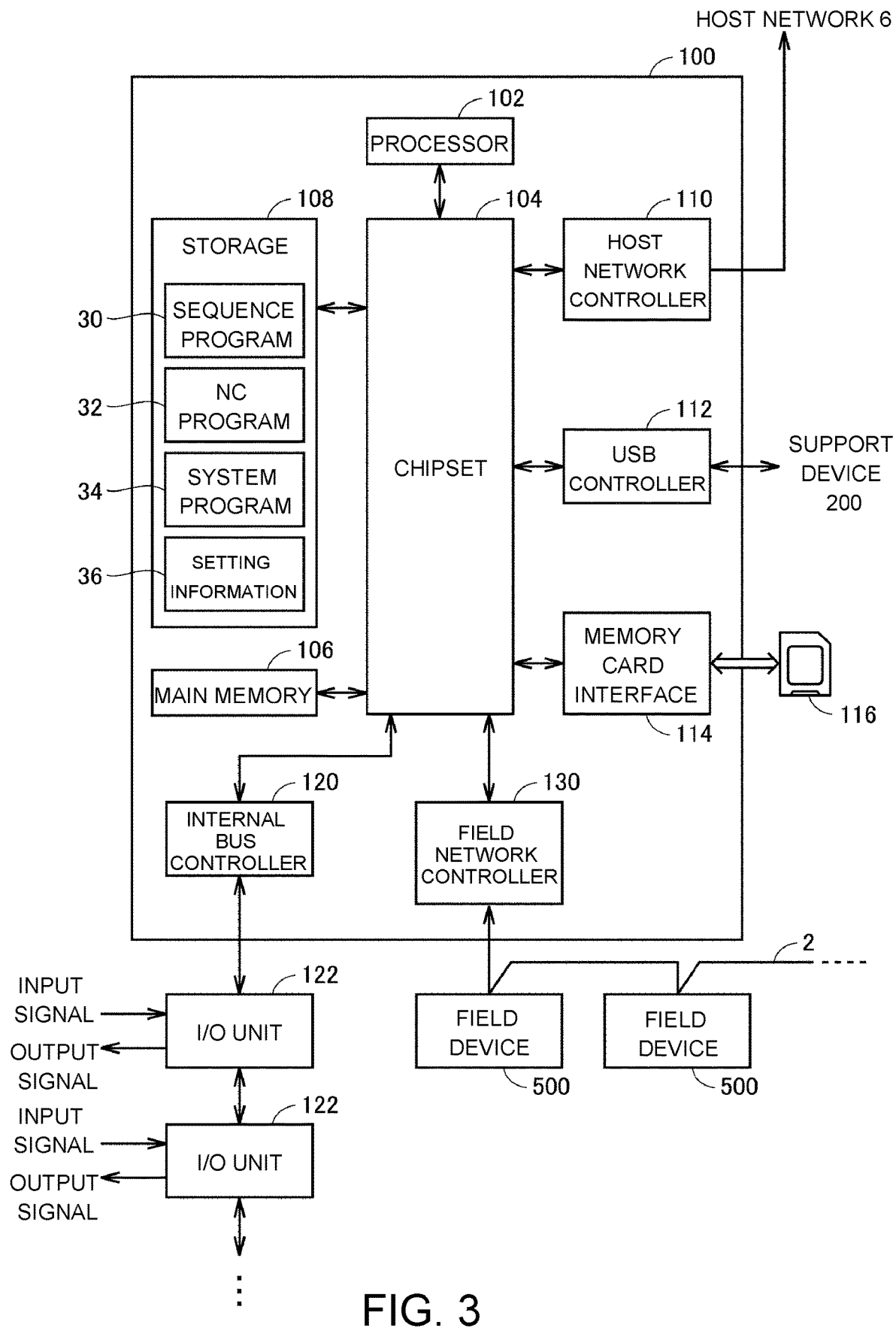
FIG. 3 is a block diagram illustrating an example of a hardware configuration of the control device according to the embodiment.

FIG. 3 is a block diagram illustrating an example of the hardware configuration of the control device 100 according to the embodiment. Referring to FIG. 3, the control device 100 is an operation processing unit which is called a CPU unit and includes a processor 102, a chipset 104, a main memory 106, a storage 108, a host network controller 110, a universal serial bus (USB) controller 112, a memory card interface 114, an internal bus controller 120, and a field network controller 130.

The processor 102 includes a central processing unit (CPU), a micro processing unit (MPU), a graphics processing unit (GPU), and the like. A configuration including a plurality of cores may be employed as the processor 102, or a plurality of the processors 102 may be provided. The chipset 104 implements the entire processes of the control device 100 by controlling the processor 102 and peripheral elements. The main memory 106 is constituted by a volatile storage device such as a dynamic random access memory (DRAM) or a static random access memory (SRAM). The shared memory 190 illustrated in FIG. 1 is typically embodied by the main memory 106. The storage 108 is constituted by a nonvolatile storage device such as a hard disk drive (HDD) or a solid-state drive (SSD).

The processor 102 implements control corresponding to the control target and various processes which will be described later by reading various programs stored in the storage 108 and loading and executing the programs in the main memory 106. In addition to a system program 34 that implements basic functions, user programs (the sequence program 30 and the NC program 32) which are prepared corresponding to the manufacturing equipment or facilities as a control target are stored in the storage 108.

The host network controller 110 controls exchange of data with the server device 300, the display device 400 (see FIG. 3), and the like via the host network 6. The USB controller 112 controls exchange of data with the support device 200 through USB connection.

The memory card interface 114 has a configuration in which a memory card 116 is attachable and detachable thereto and therefrom, and is configured to write data to the memory card 116 or to read a variety of data (a user program or trace data) from the memory card 116.

The internal bus controller 120 controls exchange of data with an I/O unit 122 mounted on the control device 100. The field network controller 130 controls exchange of data with the field device via the field network 2.

FIG. 3 illustrates an example of a configuration in which the processor 102 executes a program to provide necessary functions, but some or all of the functions to be provided may be mounted using a dedicated hardware circuit (for example, an application specification integrated circuit (ASIC) or a field-programmable gate array (FPGA)). Alternatively, principal parts of the control device 100 may be implemented using hardware based on a general-purpose architecture (for example, an industrial PC based on a general-purpose PC). In this case, virtualization technology may be used to enable a plurality of operating systems (OSs) having different purposes to be executed in parallel and enable necessary applications to be executed on the OSs.

In the control system 1 illustrated in FIG. 2, the control device 100, the support device 200, and the display device 400 are configured individually, but a configuration in which all or some of the functions are integrated on a single device may be employed.

D. PROGRAM EXECUTING MECHANISM

An example of a program executing mechanism of the control device 100 according to the embodiment will be described below. Referring back to FIG. 1, the control device 100 includes the sequence program executing unit 150 that executes the sequence program 30 and the numerical control program executing unit 160 that executes the NC program 32.

More specifically, the sequence program executing unit 150 includes a sequence command interpreting unit 152, a library 154, and a motion instruction value calculating unit 156.

The sequence command interpreting unit 152 interprets the sequence command included in the sequence program 30 and performs a designated sequence operation (a logic operation). The library 154 provides codes corresponding to a control command other than a simple sequence included in the sequence program 30. For example, when the sequence program 30 can be written using a functional block capable of performing complex processes, codes required for interpreting and executing the function block are acquired with reference to the sequence program 30.

The motion instruction value calculating unit 156 calculates an instruction value in accordance with the motion command included in the sequence program 30. The motor command defines calculation of the instruction value over a plurality of control cycles by one command, and the motion instruction value calculating unit 156 interprets the motor command and updates a motion instruction value for each control cycle.

One or more instruction values 182 which are calculated for each control cycle by the sequence command interpreting unit 152 and the motion instruction value calculating unit 156 of the sequence program executing unit 150 are output to the shared memory 190.

On the other hand, the NC program executing unit 160 executes the NC program 32 in an interpreter manner and calculates the instruction values for each motor. The calculation (updating) of the instruction values performed by the NC program executing unit 160 is repeatedly performed for each control cycle. In this way, the NC program executing unit 160 calculates the instruction values based on the NC program 32 in synchronization with calculation of the instruction values performed by the sequence program executing unit 150. In order to realize calculation of the instruction values for each control cycle, an intermediate code for calculating the instruction values is used in the NC program executing unit 160.

More specifically, the NC program executing unit 160 includes an interpreter 162, an intermediate code buffer 164, and a CNC instruction value calculating unit 168.

The interpreter 162 interprets at least a part of the NC program 32 and creates an intermediate code 166. More specifically, the interpreter 162 creates the intermediate code 166 by sequentially interpreting the NC program 32, and sequentially stores the created intermediate code 166 in the intermediate code buffer 164. The interpreter 162 creates the intermediate code 166 from the NC program 32 previously by a certain degree. Accordingly, a plurality of intermediate codes 166 may be stored in the intermediate code buffer 164. In this embodiment, the interpreter 162 creates a trace for calculating the instruction value 184 and thus may be referred to as a "planner."

The CNC instruction value calculating unit 168 calculates the instruction value 184 for each control cycle in accordance with the intermediate code 166 which has been previously created by the interpreter 162. In general, since commands (codes) written in the NC program are sequentially interpreted, there is no guarantee that the instruction value 184 can be calculated for each operation cycle, but calculation of the instruction value 184 for each control cycle can be implemented using the intermediate code 166.

The interpreter 162 sequentially queues the created intermediate codes 166 in the intermediate code buffer 164, and the CNC instruction value calculating unit 168 reads the intermediate codes 166 in the order in which the intermediate codes 166 are sequentially queued in the intermediate code buffer 164.

The "intermediate code" in the disclosure is a concept including any command for calculating the instruction value for each control cycle in accordance with the sequentially interpreted program (which is originally not suitable for a process of updating the instruction value for each predetermined cycle). That is, the intermediate code may be any code if it can enable the CNC instruction value calculating unit 168 to calculate the instruction value 184 for each control cycle. Typically, the "intermediate code" includes one or more commands or one or more functions.

The instruction value 184 which is calculated for each control cycle by the CNC instruction value calculating unit 168 of the NC program executing unit 160 is output to the shared memory 190.

E. INTERMEDIATE CODE

An example of the intermediate code that the interpreter 162 of the NC program executing unit 160 creates by interpreting the NC program 32 will be described below.

In general, the NC program 32 includes codes which are sequentially interpreted in an interpreter manner, and the time required for sequentially interpreting the codes varies according to the contents written in the codes. That is, since the codes are sequentially interpreted in an interpreter manner, it is not easy to calculate the instruction value for each control cycle.

Therefore, in the control device 100 according to the embodiment, the interpreter 162 of the NC program executing unit 160 interprets one or more codes which are written in the NC program 32, and creates the intermediate code 166 for calculating the instruction value for each control cycle based on the interpreted contents. Since the intermediate code 166 is created for each one or more codes described in the NC program 32, a plurality of intermediate codes 166 are generally created from one NC program 32. The created intermediate codes 166 are sequentially queued in the intermediate code buffer 164 of the NC program executing unit 160.

In each of the intermediate codes 166, a function capable of calculating the instruction value may be defined using a variable relevant to time as an input. That is, the intermediate code 166 may be a function which is used for the CNC instruction value calculating unit 168 of the NC program executing unit 160 to update the instruction value for each control cycle. By using such a function, the CNC instruction value calculating unit 168 can calculate the instruction value for each control cycle by sequentially referring to the created intermediate codes 166.

More specifically, the intermediate code 166 may be a function of defining a relationship between the time and the instruction value. The time, an elapsed time from a certain reference time, a number of accumulated control cycles, and the like can be used as the variable relevant to the time for defining the intermediate code 166.

For example, when the first intermediate code 1 is the code that defines the instruction value in a period which is 10 times the control cycle, the CNC instruction value calculating unit 168 of the NC program executing unit 160 queues the intermediate code 1 and periodically calculates the instruction value in the period corresponding to 10 control cycles. Similarly, other intermediate code 2 and intermediate code 3 are codes, by which the instruction values can be basically calculated over a plurality of control cycles.

Accordingly, if the process of creating the intermediate code from the NC program 32 performed by the interpreter 162 of the NC program executing unit 160 is performed sufficiently earlier than the process of calculating the instruction value performed by the CNC instruction value calculating unit 168 of the NC program executing unit 160, the process based on the NC program 32 can be performed in synchronization with the process based on the sequence program 30.

Figure 4A:
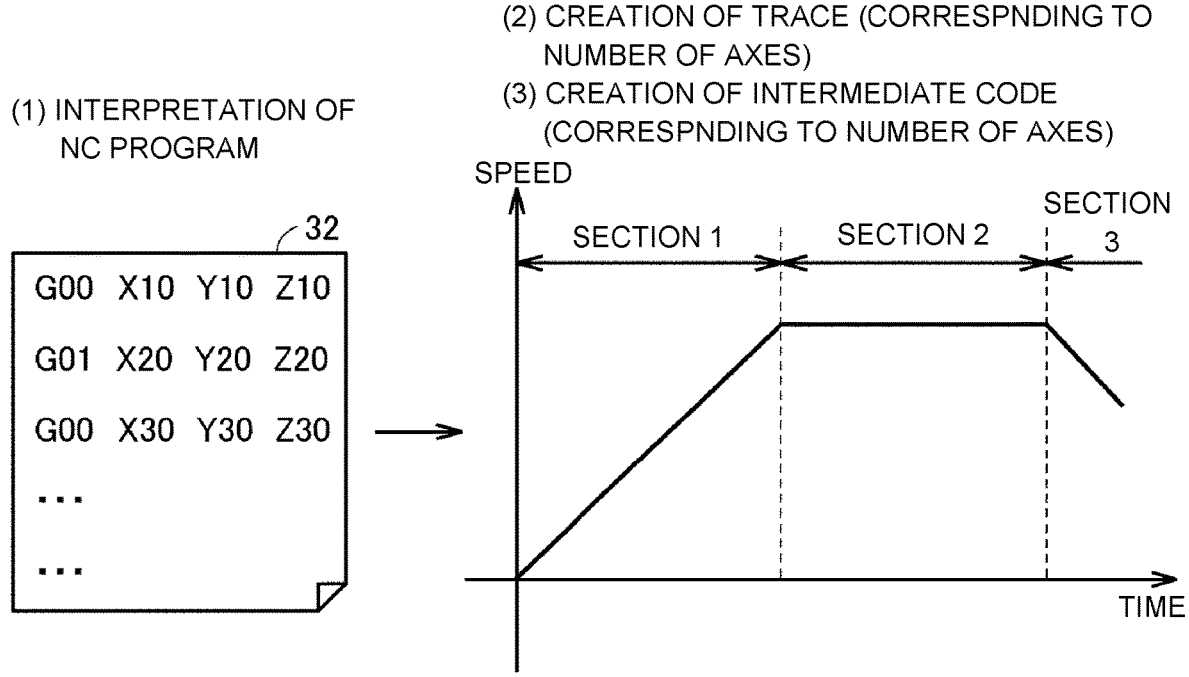
FIG. 4(A) and FIG. 4(B) are diagrams schematically illustrating an example in which an intermediate code is created in the control device according to the embodiment.
Figure 4B:
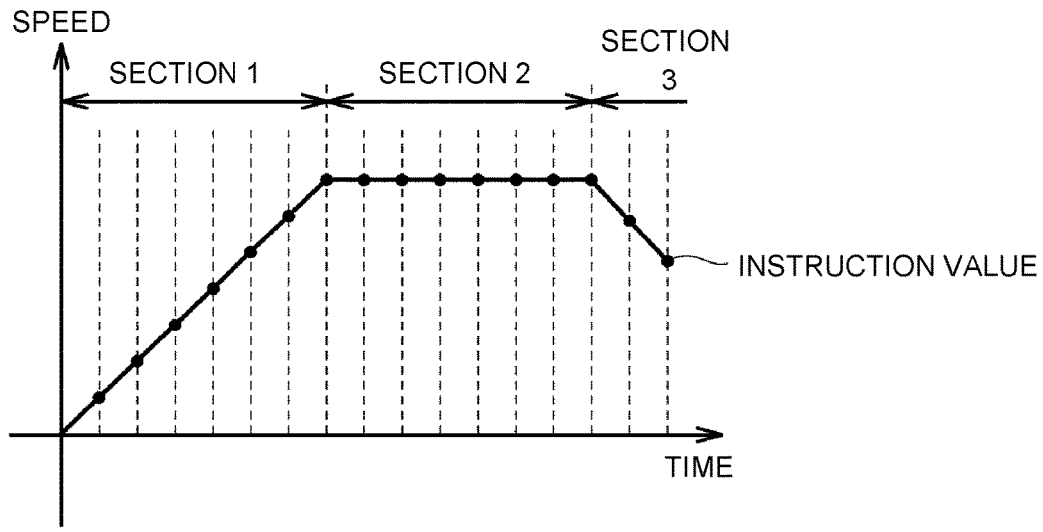

FIG. 4(A) and FIG. 4(B) are diagrams schematically illustrating an example in which the intermediate code is created in the control device 100 according to the embodiment. Referring to FIG. 4(A), when the interpreter 162 of the NC program executing unit 160 sequentially executes the NC program 32, the commands included in the NC program 32 are interpreted ((1) NC program interpretation). By the interpretation of the commands, a defined trace is internally created ((2) trace creation (corresponding to the number of axes)). For each of the axes belonging to the axis group, a trace may be created, or a trace defining the overall behavior of the axes belonging to the axis group may be created.

Finally, the interpreter 162 divides the created trace into predetermined sections and then creates one or more functions (intermediate codes) defining the trace of each section ((3) intermediate code creation (corresponding to the number of axes)). The one or more functions may be created for each of the axes belonging to the axis group, or a function defining the overall behavior of the axes belonging to the axis group may be created.

A plurality of sections may be defined by a common intermediate code, or one section may be further divided to create the respective common codes thereof. That is, the commands of the NC program 32 or the sections of the trace defined by the commands do not need to match the number of the created intermediate codes, and may be arbitrarily created. An output form of the intermediate codes 166 may be appropriately designed in consideration of a time width of the control cycle required.

As illustrated in FIG. 4(A), for example, the intermediate code 166 may be a function defining a relationship between the time and the instruction value. In the example illustrated in FIG. 4(A), a trace which has been internally created can be defined by a combination of straight lines. For example, with respect to the X axis, functions Fx1(t), Fx2(t), and Fx3(t) indicating a relationship between the time and the velocity for the trace of each straight section (sections 1 to 3) can be output. With respect to other axes (for example, the Y axis and the Z axis) belonging to the same axis group, functions may be respectively output similarly.

As illustrated in FIG. 4(B), when the CNC instruction value calculating unit 168 of the NC program executing unit 160 calculates the instruction value for each control cycle in accordance with the created intermediate codes 166, the instruction value for each control cycle is calculated ((4) instruction value calculation (the number of axes). That is, by inputting the time of each control cycle to the function corresponding to each section, the instruction value at the time can be uniquely determined. When a certain axis group is set, the instruction values may be synchronously output with respect to each axis belonging to the axis group.

FIG. 4(A) and FIG. 4(B) illustrate an example described by G codes which are used in CNC, but the disclosure is not limited thereto, and any language can be used if the program is executed in an interpreter manner. The format of the created intermediate codes may be varied corresponding to the language form to be processed.

F. INSTRUCTION VALUE FOR AXIS GROUP

An example of the instruction values which are calculated for each control cycle for one or more axes (motors) set as an axis group will be described below.

Figure 5:
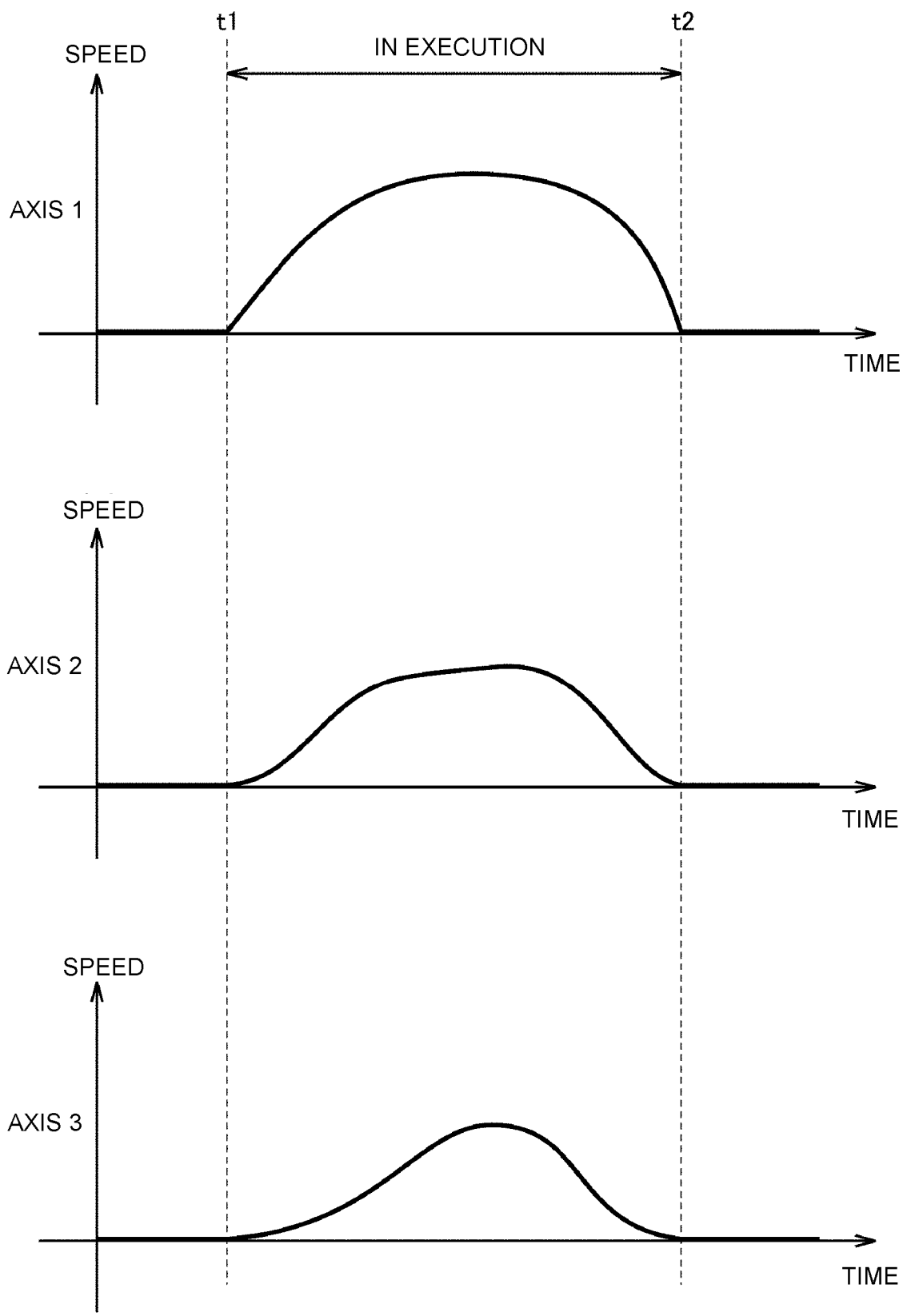
FIG. 5 is a diagram illustrating an example of a waveform of an instruction value over time for the motors constituting an axis group from the control device according to the embodiment.

FIG. 5 is a diagram illustrating an example of a waveform of an instruction value over time for the motors constituting an axis group from the control device 100 according to the embodiment. As illustrated in FIG. 5, for example, a case in which the CNC machine tool 540 operates between time t1 and time t2 is considered. In order to implement such an operation, the instruction values for axes 1 to 3 (velocity instruction values in the example illustrated in FIG. 5) are all zero before time t1 and are all zero after time t2.

At time t1, the instruction values change synchronously and thus the axes start the designated operations. In addition, the instruction values of the axes decrease gradually to zero toward time t2.

As illustrated in FIG. 5, the instruction values are respectively given to the axes (that is, the motors) set in the same axis group in synchronization with each other. By giving the instruction values in synchronization with each other, the CNC machine tool 540 can be enabled to accurately perform target operations.

G. EXAMPLE OF PROCEDURE OF SETTING AXIS GROUP

An example of a procedure of setting an axis group will be described below. Typically, the axis group can be set using the support device 200 which is connected to the control device 100. That is, a support device that provides a user interface for receiving designation of a plurality of motors belonging to an axis group may be connected to the control device 100.

Figure 6:
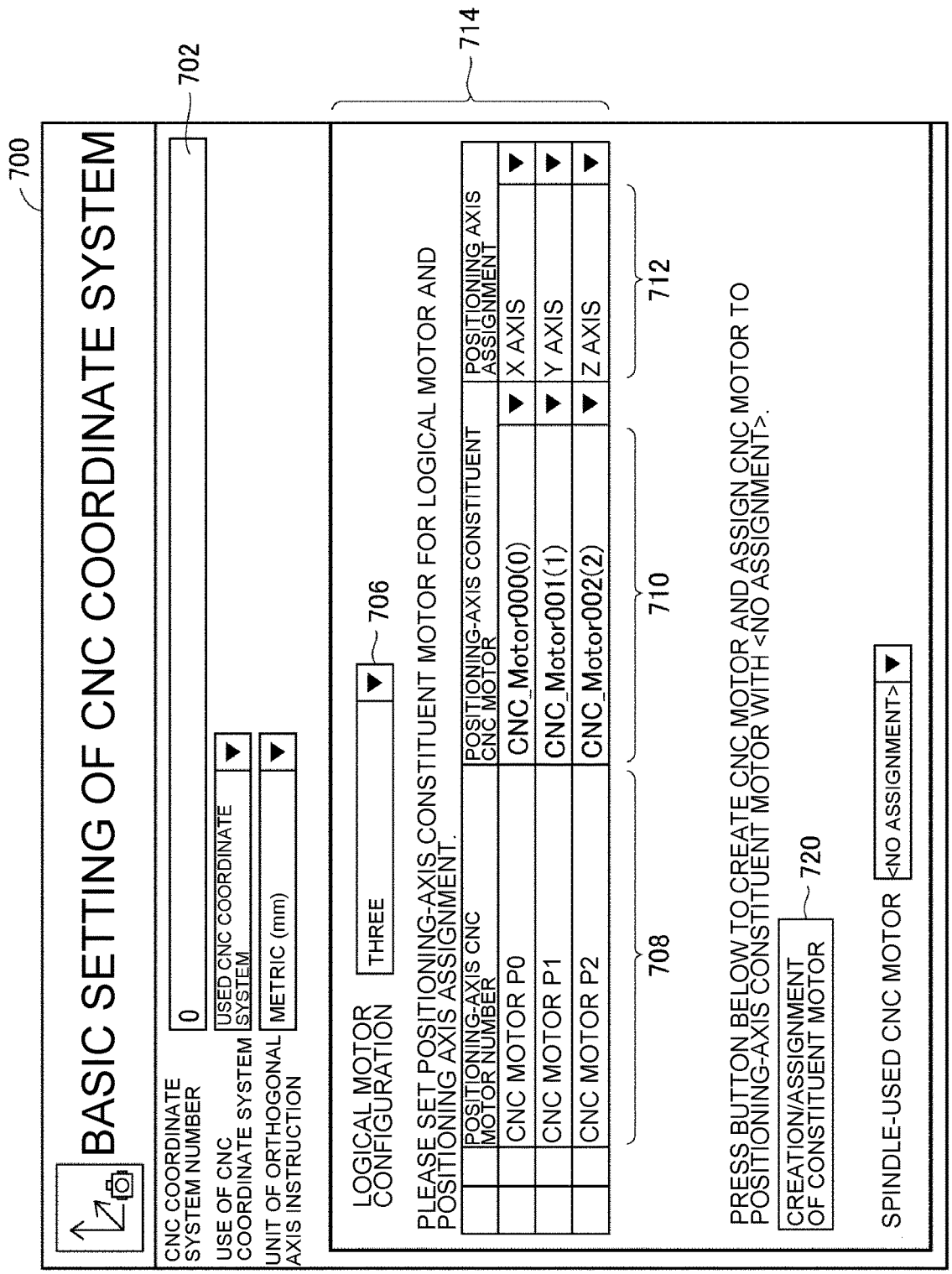
FIG. 6 is a diagram schematically illustrating an example of a user interface screen which is provided on a support device connected to the control device according to the embodiment.

FIG. 6 is a diagram schematically illustrating an example of a user interface screen which is provided on the support device 200 connected to the control device 100 according to the embodiment. Referring to FIG. 6, identification information of the axis group and the axes belonging to the axis group can be set on an axis setting screen 700.

The axis setting screen 700 includes a coordinate system number input field 702. An identification number for uniquely specifying the axis group is input to the coordinate system number input field 702.

The axis setting screen 700 additionally includes a member setting field 714 that receives selection of the motors (axes) which belong to the target axis group. The member setting field 714 includes a number-of-motors input field 706, a logic motor number input field 708, a constituent motor number input field 710, an assigned axis input field 712.

The number of the axes belonging to the target axis group is input to the number-of-motors input field 706. Identifiers (or variables) for specifying the axes (motors) in the sequence program 30 or the NC program 32 are input to the logic motor number input field 708. A user can input any name capable of facilitating reference to the axes in the program to the logic motor number input field 708. In the example illustrated in FIG. 6, names such as "CNC_motor P0," "CNC_motor P1," and "CNC Motor P2" are given.

Identification information in the configuration information (configuration) managed by the control device 100 for specifying the axes belonging to the target axis group is input to the constituent motor number input field 710. In the example illustrated in FIG. 6, "CNC_Motor000(0)," "CNC_Motor001(1)," and "CNC_Motor002(2)" are set as the identifiers on the configuration information.

Information, that is, which axis in the CNC coordinate system each motor belonging to the target axis group corresponds to, is input to the assigned axis input field 712. For example, in an X-Y-Z coordinate system, the X axis, the Y axis, and the Z axis are correlated with the corresponding motors.

Finally, by pressing a creation button 720, the axis group, the motors belonging to the axis group, and the axes assigned to the motors are determined. That is, by assigning the axis corresponding to each motor belonging to the axis group, the CNC coordinate system which is defined by the axis group is determined.

The setting of the axis group may be stored in the storage 108 or the like as at least a part of the setting information 36 (see FIG. 1).

In the above description, the configuration in which the support device 200 provides the user interface screen has been described, but the disclosure is not limited thereto and a function of providing the user interface screen may be mounted in the control device 100 itself. For example, a web server function may be mounted in the control device 100 and the user interface screen may be provided using the web server function.

H. STATE CHANGE OF CONTROL STATE

As described above, the control device 100 according to the embodiment manages the control state 172 with respect to an axis group including a plurality of motors. An example of the control state 172 which is managed by the state managing unit 170 will be described below.

Figure 7:
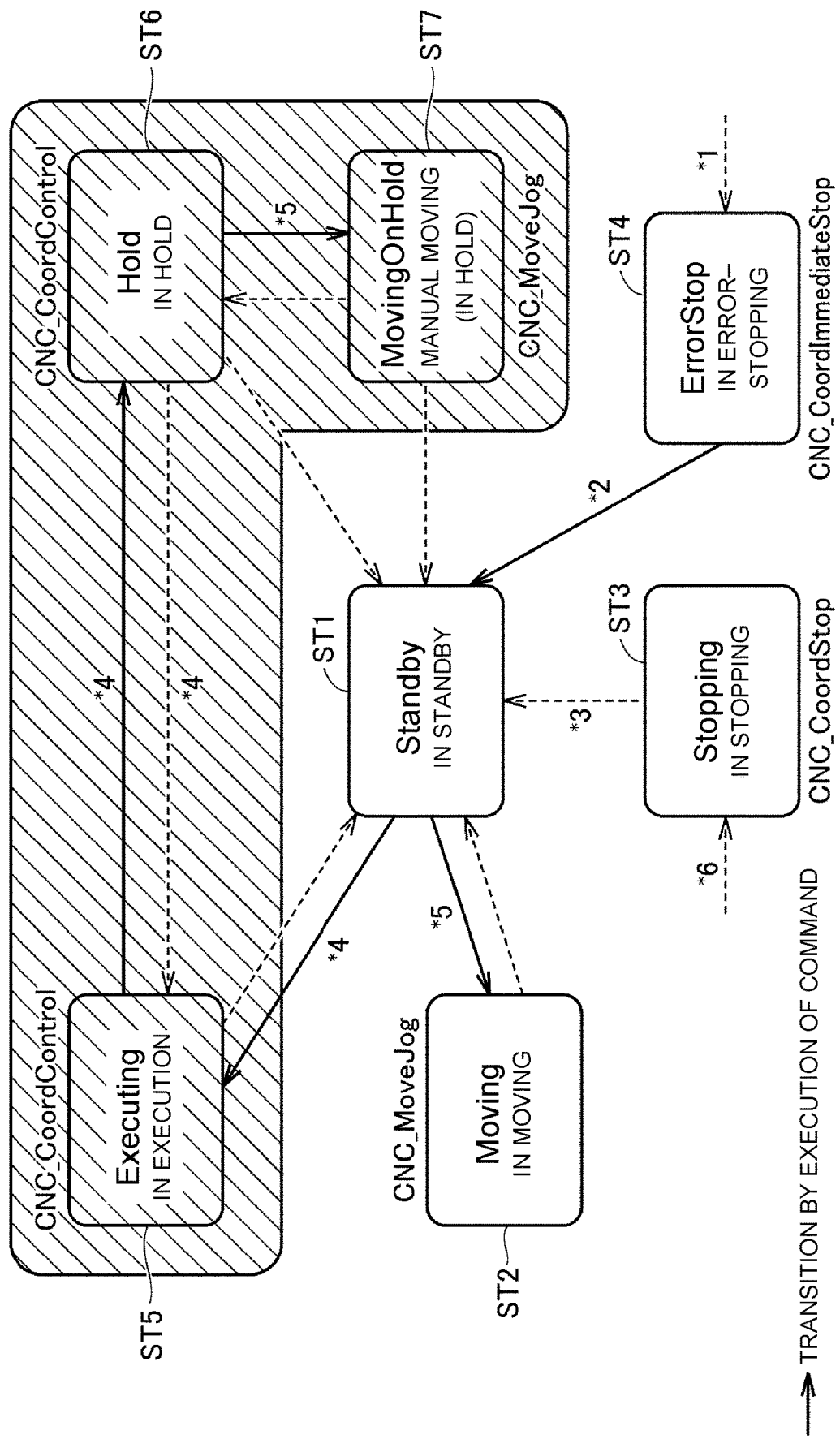
FIG. 7 is a diagram illustrating an example of state change of an axis group in the control device according to the embodiment.

FIG. 7 is a diagram illustrating an example of state change of the axis group in the control device 100 according to the embodiment. Referring to FIG. 7, each axis group can take seven states ST1 to ST7. By issuing a command (hereinafter also referred to as a "moving command of the CNC coordinate system") indicating an operation in the CNC coordinate system which is defined by a plurality of motors belonging to any axis group, the state changes. The moving command of the CNC coordinate system may be created when the NC program executing unit 160 executes the NC program 32 or may be created in accordance with a special command defined by the sequence program 30.

Among these states, states ST1 to ST4 are state values that can be taken when the moving command of the CNC coordinate system or the like is arbitrarily output in accordance with a command defined in the sequence program 30 which is executed by the sequence program executing unit 150 or the like, and states ST5 to ST7 are state values that can be taken while the NC program 32 is executed in the NC program executing unit 160.

In this way, the state managing unit 170 of the control device 100 switches the control state between a plurality of states (states ST5 to ST7) that can be taken when the NC program executing unit 160 is executing the NC program 32 and a plurality of states (states ST1 to ST4) that can be taken when the NC program executing unit 160 is not executing the NC program 32. The states ST1 to ST7 will be described below.

The state ST1 corresponds to "in standby (Standby)" and denotes a state in which the moving command of the CNC coordinate system is not executed. The state ST1 also includes a state in which the NC program 32 is executed up to a specific block row and stops at a program point.

The state ST2 corresponds to "in moving (Moving)" and denotes a state in which a CNC_MoveJog (CNC coordinate-system moving) command is being executed. When the command in execution is completed or interrupted, the control state changes to the state ST1.

The state ST3 corresponds to "in stopping (Stopping)" and denotes a state in which a CNC_CoordStop (CNC coordinate-system forcible stopping) command is being executed. When the program stops in accordance with the CNC_CoordStop command and then Execute (starting) is in a "TRUE" state, the state ST3 is maintained.

The state ST4 corresponds to "in error-stopping (Error-Stop)" and denotes a state in which an abnormality occurs in the CNC coordinate system. The state ST4 can include a state in which a CNC_CoordImmediateStop (CNC coordinate-system immediate stopping) is being executed and a state in which the CNC coordinate system is stopping due to occurrence of an abnormality in the CNC coordinate system. In the state ST4, even if the moving command of the CNC coordinate system is issued, moving is prohibited.

The state ST5 corresponds to "in execution (Executing)" and denotes a state in which the NC program 32 is being executed in accordance with a CNC_CoordControl (CNC coordinate system control) command.

The state ST6 corresponds to "in hold (Hold)" and denotes a state of standby due to hold (suspension) of the NC program 32. The state ST6 includes a suspend state of the NC program 32 due to execution of an optional stop command and execution of a single block.

The state ST7 corresponds to "manual moving (in hold) (MovingOnHold)" and denotes a state in which a CNC_MoveJog command is being executed during standby due to hold of the NC program 32. When the command in execution is completed or interrupted, the control state changes to the state ST7.

FIG. 7 illustrates conditions associated with state change. A solid line in FIG. 7 denotes change in response to execution of a certain command, and a dotted line in FIG. 7 denotes change caused by completion of execution of a certain command or occurrence of another event.

For example, the change from the state ST2 to the state ST1 and the change from the state ST7 to the state ST6 are caused by completion of execution of the CNC_MoveJog command. The change from the states ST5, ST6, and ST7 to the state ST1 is caused by completion of execution of the NC program 32. The changes illustrated in FIG. 7 correspond to numerals beginning with * in the drawing, as follows.

*1: Any state changes to the state ST4 when an abnormality occurs in the CNC coordinate system.

*2: The state changes from the state ST4 to the state ST1 due to release of an abnormality in accordance with a CNC_CoordReset (CNC coordinate-system reset) command or a ResetCNCError (reset CNC error) command.

*3: When a "done (completion)" output of the CNC_CoordStop command is "TRUE" and an "Execute (start)" input of the CNC_CoordStop command is "FALSE," the state changes from the state ST3 to the state ST1.

*4: The state changes from the state ST1 to the state ST5 due to execution of the CNC_CoordControl command.

*5: The state changes from the state ST6 to the state ST7 due to execution of a special command. *6: Any state changes to the state ST3 when the CNC_CoordStop command is executed.

I. SEQUENCE PROGRAM

An example of commands and variables which are used for the sequence program will be described below.
(i1: Command)

In the above description of the state change, the states are changed in accordance with some commands. Cases of execution of some commands have been described as conditions for the state change. Commands for causing the state change will be described below.

The CNC_MoveJog (CNC coordinate-system moving) command instructs the motors constituting the CNC coordinate system to move to any position. Basically, the CNC_MoveJog command is executed in a state in which the NC program 32 is not executed.

The CNC_CoordStop (CNC coordinate-system forcible stopping) command instructs the motors belonging to the target CNC coordinate system (axis group) to forcibly stop moving. Typically, the CNC_CoordStop is used in combination with a certain abnormality condition.

The CNC_CoordImmediateStop (CNC coordinate-system immediate stopping) command instructs the motors belonging to the target coordinate system (axis group) to forcibly stop moving. The CNC_CoordStop command decreases the instruction value at a rate in consideration of mechanical protection or the like. In contrast thereto, the CNC_CoordImmediateStop command immediately changes the instruction value to zero. Typically, the CNC_CoordStop command is used in combination of a certain abnormality condition or the like.

The CNC_CoordControl (CNC coordinate system control) command is a command for starting execution of the NC program 32 in the NC program executing unit 160. A function block corresponding to the CNC_CoordControl command will be described below.

The CNC_CoordReset (CNC coordinate system reset) command is a command for initializing (resetting) the instruction value or the like for each motor belonging to the target CNC coordinate system (axis group).

The ResetCNCError (Reset CNC error) command is a command for restoring (resetting) an error occurring in the target CNC coordinate system (axis group).

Commands included in the sequence program 30 may be defined in the form of function blocks.

FIG. 8 is a diagram schematically illustrating a function block corresponding to the CNC_CoordControl (CNC coordinate system control) command in the control device 100 according to the embodiment. Referring to FIG. 8, a function block 600 of the CNC_CoordControl command includes CNC coordinate system identification information 601, a numerical control input 602, and a numerical control output 603 as input and output (attribute values). The function block 600 includes a validation instruction input 604 (Enable) as an input. The function block 600 includes a valid state input 605 (Enabled), a busy state input 606 (Busy), an error state input 607 (Error), and an error code 608 (ErrorID) as outputs.

Identification information (numerical values set in the coordinate system number input field 702 in FIG. 6) for specifying the target CNC coordinate system is designated in the CNC coordinate system identification information 601.

Object names indicating a group of data which is transmitted and received between the sequence program executing unit 150 and the NC program executing unit 160 are designated in the numerical control input 602 and the numerical control output 603. A variable name indicating an object in which a group of data transmitted from the sequence program executing unit 150 to the NC program executing unit 160 is stored is designated in the numerical control input 602, and a variable name indicating an object in which a group of data transmitted from the NC program executing unit 160 to the sequence program executing unit 150 is stored is designated in the numerical control output 603. The objects are a type of structure variable and have a plurality of attribute values. The sequence program 30 can also refer to the attribute values of the objects.

A result of an execution start condition of the NC program 32 performed by the NC program executing unit 160 is designated in the validation instruction input 604.

A value (a Boolean value) indicating an execution state of the NC program 32 in the designated CNC coordinate system is output from the valid state input 605. A value (a Boolean value) indicating whether the designated CNC coordinate system is busy is output from the busy state input 606. A value (a Boolean value) indicating whether an error occurs is output from the error state input 607. When an error occurs, a code indicating contents of the error is output from the error code 608.

(i2: Structure Variable)

The axis group state change illustrated in FIG. 7 may be stored as a member of a structure variable indicating the axis group for reference. That is, the state managing unit 170 may store the value of the control state such that the value can be referred to as a member of the structure variable.

FIG. 9 is a diagram illustrating an example of a structure variable correlated with an axis group in the control device 100 according to the embodiment. FIG. 9 illustrates an example of a structure variable 620 correlated with CNC_Coord[0]. The structure variable 620 can be expressed as a hierarchical structure. For example, the structure variable 620 has a hierarchy 622 indicating an axis group state.

The hierarchy 622 includes members corresponding to the states illustrated in FIG. 7 and the value indicated by each member is updated corresponding to the axis group state. For example, when the target axis group is in standby (Standby), "CNC_Coord[0].Status.Standby" indicates "TRUE" and the other members in the same hierarchy all indicate "FALSE."

The structure variable 620 may have information on setting of a corresponding axis group as a new member. For example, the structure variable 620 additionally includes a hierarchy 624 indicating basic setting of an axis group. The hierarchy 624 includes setting values related to the target axis group as members. By referring to the values indicated by the members, the setting values of the target axis group can be easily referred to in the sequence program 30.

For the convenience of description, a hierarchical structure is illustrated in FIG. 9, but the form of storing the actual values of the members is not limited thereto and can employ any implementation.

(i3: Example of Code of Sequence Program)

An example of a code of a sequence program using the above-mentioned function block and the above-mentioned structure variable will be described below.

The sequence program executing unit 150 of the control device 100 calculates an operation result based on the sequence program 30 in reflection of the value of the control state managed by the state managing unit 170 in accordance with a command for referring to the control state, which is included in the sequence program 30. That is, in execution of the sequence program 30, the control state of any axis group can be referred to and a prescribed process can be selectively performed based on the value of the referred-to control state.

Figure 10:
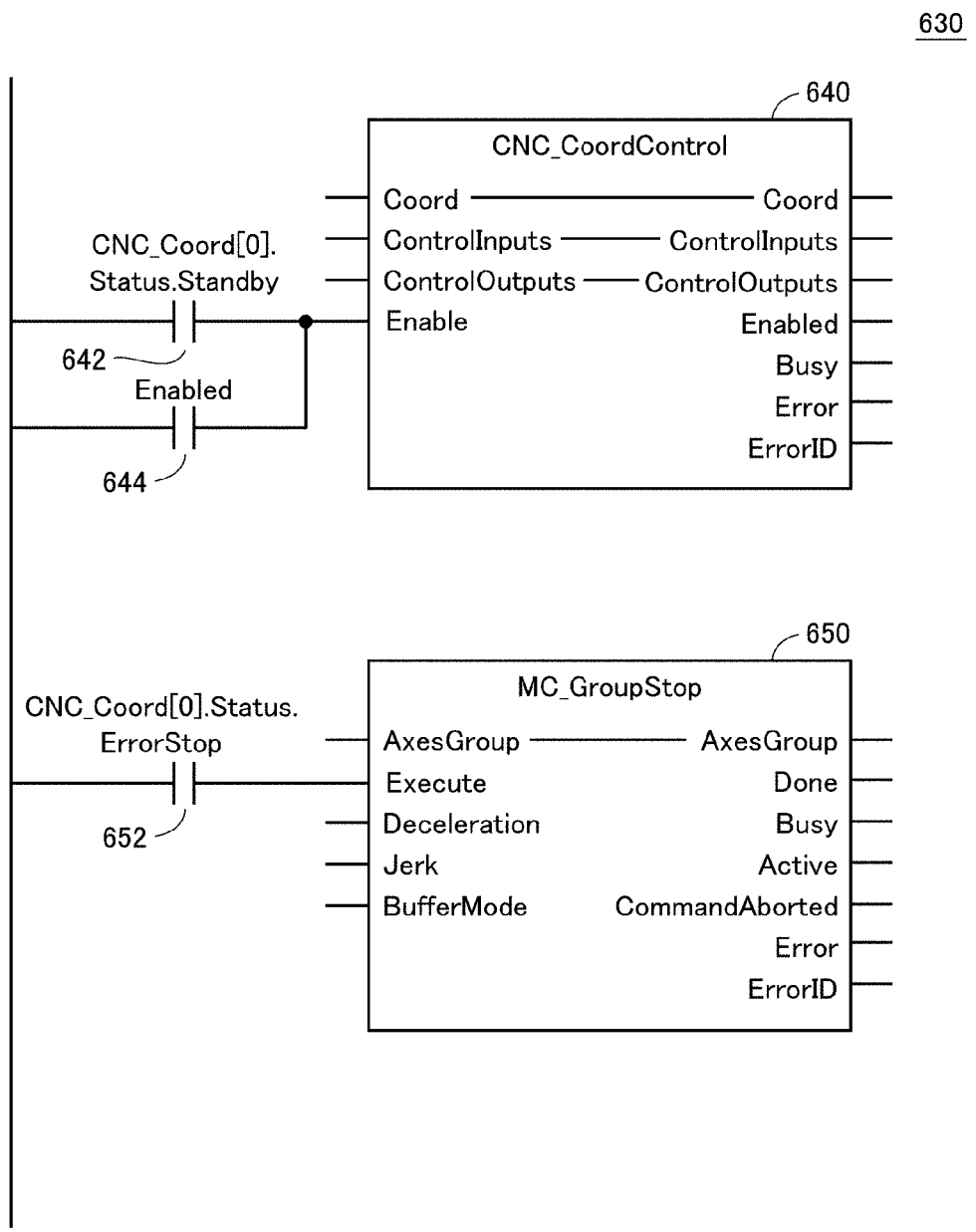
FIG. 10 is a diagram illustrating an example of a code of a sequence program which is executed in the control device according to the embodiment.

FIG. 10 is a diagram illustrating an example of a code in the sequence program 30 which is executed in the control device 100 according to the embodiment. It is assumed that a code 630 of the sequence program 30 illustrated in FIG. 10 performs control on a CNC machine tool based on the NC program 32 and control on a motion driving device such as a robot that moves in cooperation with the CNC machine tool.

More specifically, the code 630 includes a function block 640 of a CNC_CoordControl command and a logical description input to an enable instruction input (Enable) of the function block 640. The function block 640 is, for example, a command for starting control based on a predetermined NC program 32 for a CNC coordinate system (an axis group) corresponding to CNC_Coord[0].

The logical description input to the enable instruction input of the function block 640 is a parallel circuit of a contact 642 indicating that the target axis group state is "in standby (Standby)" and a contact 644 indicating that the function block 640 is in an enabled state (Enabled). The logical description is a so-called self-holding circuit. That is, the function block 640 takes a condition that the target axis group state is in standby (Standby) as a starting condition, and takes a condition that the function block 640 is in an enabled state (Enabled) as a continuous operating condition.

The contact 642 can be easily defined by referring to members (attributes) indicating states of the structure variable indicating the target axis group. The contact 644 can be easily defined by referring to a value of an output flag from the function block 640.

The code 630 also includes a function block 650 of an MC_GroupStop command and a logical description input to a start instruction input (Execute) of the function block 650. The function block 650 is a command for stopping the operation of the target motor driving device such as a robot.

When the CNC coordinate system (the axis group) corresponding to CNC_Coord[0] is "in error-stopping (ErrorStop)," "TRUE" is input to the start instruction input of the function block 650. That is, when an error occurs in the target CNC coordinate system (the axis group), an instruction for simultaneously stopping the operation can also be issued to the target motion driving device. The logical description input to the enable instruction input of the function block 650 includes a contact 652 indicating that the target axis group state is "in error-stopping (ErrorStop)".

In this way, when the CNC machine tool and the robot are made to operate in cooperation with each other or the like, a program for stopping one device in response to stop due to occurrence of an abnormality in the other device can be easily prepared.

As described above, in the control device 100 according to the embodiment, since the state of the target CNC coordinate system (an axis group) can be easily referred to by defining a variable, it is possible to reduce the number of process steps for developing a program for controlling the CNC machine tool and the device associated therewith.

J. EXAMPLE OF OPERATION OF EXECUTING PROGRAM

An example of an operation of executing a program in the control device 100 according to the embodiment will be described below.

Figure 11:
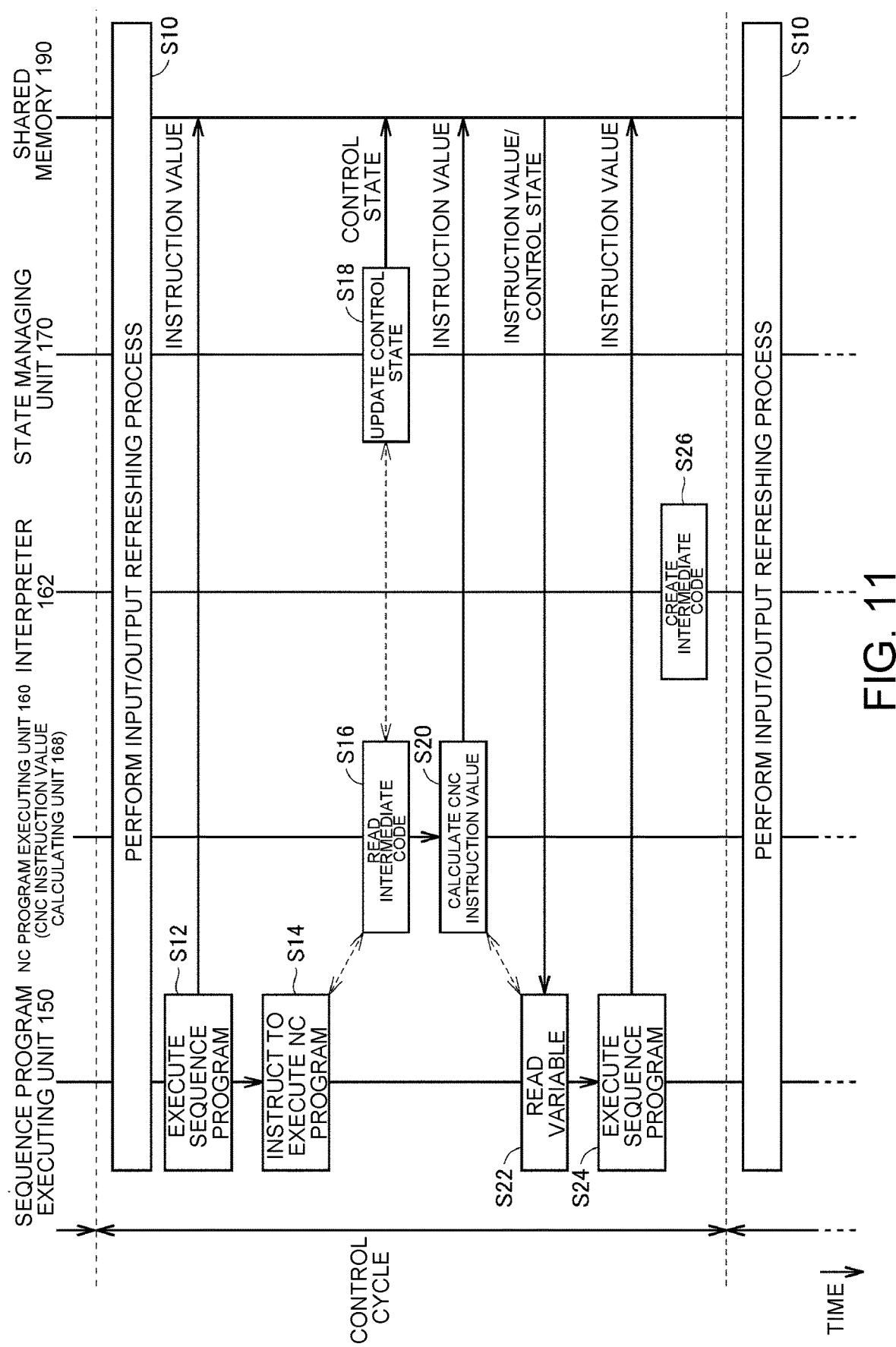
FIG. 11 is a timing chart illustrating an example of a program executing operation in the control device according to the embodiment.

FIG. 11 is a timing chart illustrating an example of an operation of executing a program in the control device 100 according to the embodiment. FIG. 11 illustrates processes in the sequence program executing unit 150, the interpreter 162 and the CNC instruction value calculating unit 168 of the NC program executing unit 160, the state managing unit 170, and the shared memory 190 which are main constituent elements in each control cycle.

Referring to FIG. 11, when a start timing of a certain control cycle arrives, an input/output refreshing process is first performed (The input/output refreshing processing unit 180 illustrated in FIG. 1) (Step S10). Subsequently, a process that the sequence program executing unit 150 executes the sequence program 30 for each control cycle is performed. In this example, the sequence program executing unit 150 executes (a part of) the sequence program 30 (Step S12). An instruction value which is calculated by executing the sequence program 30 is written to the shared memory 190.

Here, it is assumed that a command for instructing start of execution of the NC program 32 is included in the middle of the sequence program 30. The sequence program executing unit 150 instructs to start execution of the NC program 32 in response to the command (Step S14). Then, the CNC instruction value calculating unit 168 reads a target intermediate code 166 (Step S16) and calculates a CNC instruction value (Step S20). The CNC instruction value calculated by the CNC instruction value calculating unit 168 is written to the shared memory 190. In this way, the NC program executing unit 160 performs a process of calculating an instruction value for each motor in accordance with the NC program 32.

On the other hand, the state managing unit 170 updates the control state according to the execution state of the NC program 32 in the CNC instruction value calculating unit 168 (Step S18). That is, the state managing unit 170 performs a process of managing the control state correlated with the axis group. The process of managing the control state includes a process of updating the control state based on at least one of an instruction based on the control command included in the sequence program 30 and the execution state of the NC program 32.

When calculation of the CNC instruction value performed by the CNC instruction value calculating unit 168 is completed, the process routine returns to the sequence program executing unit 150. Then, the sequence program executing unit 150 restarts execution of a non-executed part of the sequence program 30.

That is, the sequence program executing unit 150 reads a value (an instruction value and/or a control state) indicated by a variable required for the process from the shared memory 190 (Step S22), and executes the sequence program 30 (Step S24). The instruction value calculated by executing the sequence program 30 is written to the shared memory 190.

The processes of Steps S10 to S24 are processes which are performed for each control cycle, and processes with a low priority are appropriately performed until the start timing of a next control cycle arrives. In the example illustrated in FIG. 11, the interpreter 162 performs the process of creating the intermediate code 166 from the NC program 32 (Step S26). The intermediate code 166 which is created in Step S26 is used to calculate the CNC instruction value after the next control cycle.

Then, when the start timing of the next control cycle arrives, the input/output refreshing process is performed again (Step S10). Thereafter, processes similar to Step S12 to S26 are repeatedly performed.

Through the above-mentioned processing routine, the sequence program executing unit 150 can refer to the control state of the CNC coordinate system (the axis group) without preparing an additional program, and programming such as mutual interlock can be easily implemented when control based on the sequence program 30 and control based on the NC program 32 are executed in parallel.

K. MODIFIED EXAMPLE

In the above, the control device 100 that executes the sequence program 30 and the NC program 32 has been described, but the same can be applied to any program if the program is written in an interpreter manner.

L. CONCLUSION

According to the embodiment, for example, a plurality of motors constituting a CNC machine tool can be defined as axes and the CNC machine tool itself can be made to be a variable (CNC variable) as an abstraction including a plurality of axes. By referring to the variable, control programming based on a sequence program is possible.

More specifically, by starting a function block command or the like with reference to the CNC variable, processes such as execution, stop, restart, abnormality-stop, and state monitoring of the NC program 32 can be realized based on a sequence program.

A program referring to a control state indicated by the CNC variable has a large part which can be shared by a program for another CNC machine tool (for example, an initialization process or an abnormality process). Accordingly, it is possible to enhance reusability.

In a configuration according to the related art, a dedicated device that controls a CNC machine tool and a PLC that controls processes such as conveyance and assembly which is disposed around the CNC machine tool are independent of each other. As for a state of the CNC machine tool which is controlled by the dedicated device, a dedicated program has to be written in the PLC and an interface using hardware has to be prepared.

On the other hand, according to the embodiment, control of a CNC machine tool can be defined using the same NC program as in the dedicated device in the related art and control of a device disposed around the CNC machine tool can be defined using a sequence program. In addition, a cooperating operation of the CNC machine tool and the peripheral device can be easily programmed by referring to the above-mentioned control state. As a result, it is possible to reduce the number of process steps of developing the entire system. Even if there are a plurality of CNC machine tools, discretion of a program is high and thus it is possible to reduce the number of process steps of developing a program and program capacity by sharing processes.

M. SUPPLEMENTARY NOTE

The above-mentioned embodiment includes the following technical concepts.

[Configuration 1]

A control device (100) that is capable of controlling a plurality of motors (522), the control device including:

a first program executing unit (150) that executes a sequence program (30) for each control cycle;

a second program executing unit (160) that calculates an instruction value for each motor in accordance with a numerical control program (32); and a state managing unit (170) that manages a control state (172) correlated with a group including a plurality of predetermined motors of the plurality of motors, wherein the sequence program includes a control command (640) for controlling a process of executing the numerical control program in the second program executing unit, wherein the first program executing unit gives an instruction relevant to execution of the numerical control program in the second program executing unit in accordance with the control command included in the sequence program, and wherein the state managing unit updates the control state based on at least one of the instruction from the first program executing unit and an execution state of the numerical control program in the second program executing unit.

[Configuration 2]

The control device according to Configuration 1, wherein the first program executing unit calculates an operation result based on the sequence program in reflection of a value of the control state managed by the state managing unit in accordance with a command (642, 652) for referring to the control state, the command being included in the sequence program.

[Configuration 3]

The control device according to Configuration 1 or 2, wherein the state managing unit stores the value of the control state such that the value is able to be referred to as a member of a structure variable (620).

[Configuration 4]

The control device according to Configuration 3, wherein the structure variable includes information on setting of a corresponding group as a new member.

[Configuration 5]

The control device according to any one of Configurations 1 to 4, wherein the state managing unit switches the control state between a plurality of states (ST5 to ST7) which are able to be taken by the second program executing unit during execution of the numerical control program and a plurality of states (ST1 to ST4) which are able to be taken by the second program executing unit during non-execution of the numerical control program.

[Configuration 6]

The control device according to any one of Configurations 1 to 5, further comprising a shared memory (190) that stores the value of the control state managed by the state managing unit.

[Configuration 7]

The control device according to any one of Configurations 1 to 6, wherein the control command included in the sequence program is defined in the form of a function block.

[Configuration 8]

The control device according to any one of Configurations 1 to 7, wherein a support device (200) that provides a user interface (700) receiving designation of the plurality of motors belonging to the group is connectable to the control device.

[Configuration 9]

The control device according to any one of Configurations 1 to 8, wherein the control state indicates a single state covering the plurality of motors included in the group.

[Configuration 10]

A control method in a control device that is capable of controlling a plurality of motors, the control method including:

a step (S12, S14, S22, S24) of executing a sequence program for each control cycle;

a step (S16, S20) of calculating an instruction value for each motor in accordance with a numerical control program; and a step (S18) of managing a control state correlated with a group including a plurality of predetermined motors of the plurality of motors, wherein the sequence program includes a control command for controlling a process of executing the numerical control program, wherein execution of the numerical control program is controlled by an instruction in accordance with the control command included in the sequence program, and wherein the step of managing the control state includes updating the control state based on at least one of the instruction in accordance with the control command included in the sequence program and an execution state of the numerical control program.

The above-disclosed embodiments should be understood to be merely exemplary, but not restrictive in all aspects. The scope of the disclosure is defined by the appended claims, not by the above description, and is intended to include all modifications within meanings and scopes equivalent to the scope of the claims.

What is claimed is:

1. A control device configured to control a plurality of motors, the control device comprising:
   a first program executing unit that executes a sequence program for each control cycle;
   a second program executing unit that calculates an instruction value for each motor in accordance with a numerical control program; and
   a state managing unit that manages a control state correlated with a group including a plurality of predetermined motors of the plurality of motors,
   wherein the sequence program includes a control command for controlling a process of executing the numerical control program in the second program executing unit,
   wherein the first program executing unit gives an instruction relevant to execution of the numerical control program in the second program executing unit in accordance with the control command included in the sequence program, and
   wherein the state managing unit updates the control state based on at least one of the instruction from the first program executing unit and an execution state of the numerical control program in the second program executing unit.

2. The control device according to claim 1, wherein the first program executing unit calculates an operation result based on the sequence program in reflection of a value of the control state managed by the state managing unit in accordance with a command referring to the control state included in the sequence program.

3. The control device according to claim 2, wherein the state managing unit stores the value of the control state such that the value is able to be referred to as a member of a structure variable.

4. The control device according to claim 3, wherein the state managing unit switches the control state between a plurality of states which are able to be taken by the second program executing unit during execution of the numerical control program and a plurality of states which are able to be taken by the second program executing unit during non-execution of the numerical control program.

5. The control device according to claim 3, further comprising a shared memory that stores the value of the control state managed by the state managing unit.

6. The control device according to claim 2, wherein the state managing unit switches the control state between a plurality of states which are able to be taken by the second program executing unit during execution of the numerical control program and a plurality of states which are able to be taken by the second program executing unit during non-execution of the numerical control program.

7. The control device according to claim 2, further comprising a shared memory that stores the value of the control state managed by the state managing unit.

8. The control device according to claim 1, wherein the state managing unit stores the value of the control state such that the value is able to be referred to as a member of a structure variable.

9. The control device according to claim 8, wherein the structure variable includes information on setting of a corresponding group as a further member.

10. The control device according to claim 9, wherein the state managing unit switches the control state between a plurality of states which are able to be taken by the second program executing unit during execution of the numerical control program and a plurality of states which are able to be taken by the second program executing unit during non-execution of the numerical control program.

11. The control device according to claim 9, further comprising a shared memory that stores the value of the control state managed by the state managing unit.

12. The control device according to claim 8, wherein the state managing unit switches the control state between a plurality of states which are able to be taken by the second program executing unit during execution of the numerical control program and a plurality of states which are able to be taken by the second program executing unit during non-execution of the numerical control program.

13. The control device according to claim 8, further comprising a shared memory that stores the value of the control state managed by the state managing unit.

14. The control device according to claim 1, wherein the state managing unit switches the control state between a plurality of states which are able to be taken by the second program executing unit during execution of the numerical control program and a plurality of states which are able to be taken by the second program executing unit during non-execution of the numerical control program.

15. The control device according to claim 14, further comprising a shared memory that stores the value of the control state managed by the state managing unit.

16. The control device according to claim 1, further comprising a shared memory that stores the value of the control state managed by the state managing unit.

17. The control device according to claim 1, wherein the control command included in the sequence program is defined in a form of a function block.

18. The control device according to claim 1, wherein a support device that provides a user interface for receiving designation of the plurality of motors belonging to the group is connected to the control device.

19. The control device according to claim 1, wherein the control state indicates a single state covering the plurality of motors included in the group.

20. A control method in a control device configured to control a plurality of motors, the control method comprising:
   a step of executing a sequence program for each control cycle;
   a step of calculating an instruction value for each motor in accordance with a numerical control program; and
   a step of managing a control state correlated with a group including a plurality of predetermined motors of the plurality of motors,
   wherein the sequence program includes a control command for controlling a process of executing the numerical control program,
   wherein execution of the numerical control program is controlled by an instruction in accordance with the control command included in the sequence program, and wherein the step of managing the control state includes updating the control state based on at least one of the instruction in accordance with the control command included in the sequence program and an execution state of the numerical control program.

\* \* \* \* \*